United States Patent
Carter (10) Patent No.: US 9,674,567 B1
(45) Date of Patent: Jun. 6, 2017

(54) ADDRESSABLE LINEAR DIGITAL ADVERTISING SYSTEM UTILIZING CPE SPLICER

(71) Applicant: BlackArrow, San Jose, CA (US)

(72) Inventor: Leslie M Carter, San Jose, CA (US)

(73) Assignee: BlackArrow, San Jose, CA (US)

( * ) Notice: Subject to any disclaimer, the term of this patent is extended or adjusted under 35 U.S.C. 154(b) by 0 days.

(21) Appl. No.: 14/807,783

(22) Filed: Jul. 23, 2015

(51) Int. Cl.
| | |
|---|---|
| *H04N 7/10* | (2006.01) |
| *H04N 7/025* | (2006.01) |
| *H04N 21/2668* | (2011.01) |
| *G06Q 30/02* | (2012.01) |
| *H04N 21/433* | (2011.01) |
| *H04N 21/44* | (2011.01) |
| *H04N 21/81* | (2011.01) |

(52) U.S. Cl.
CPC ..... *H04N 21/2668* (2013.01); *G06Q 30/0251* (2013.01); *H04N 21/4331* (2013.01); *H04N 21/44016* (2013.01); *H04N 21/812* (2013.01)

(58) Field of Classification Search
CPC ............. H04N 21/44; H04N 21/44016; H04N 21/44008
See application file for complete search history.

(56) References Cited

U.S. PATENT DOCUMENTS

| | | | | |
|---|---|---|---|---|
| 7,263,714 B2* | 8/2007 | Lowthert | ............... | H04N 7/165 348/E7.063 |
| 8,578,405 B2* | 11/2013 | Rashkovskiy | ....... | H04H 20/106 725/142 |
| 8,694,396 B1* | 4/2014 | Craner | ............... | G06Q 30/0241 705/14.25 |
| 2002/0059440 A1* | 5/2002 | Hudson | ............. | G06F 17/30902 709/231 |
| 2004/0221304 A1* | 11/2004 | Sparrell | ............ | H04L 29/06027 725/34 |
| 2005/0108091 A1* | 5/2005 | Sotak | .................. | G06Q 30/0264 705/14.61 |
| 2006/0277569 A1* | 12/2006 | Smith | ................... | G11B 27/036 725/35 |
| 2009/0144159 A1* | 6/2009 | Bashyam | ........... | G06Q 30/0257 705/14.55 |
| 2009/0304357 A1* | 12/2009 | Rashkovskiy | ....... | H04H 20/106 386/248 |
| 2011/0078723 A1* | 3/2011 | Stettner | .................. | G06Q 30/02 725/32 |

(Continued)

*Primary Examiner* — William J Kim
(74) *Attorney, Agent, or Firm* — FSP LLC (57) ABSTRACT

A linear digital advertising system includes ad decision logic configured to be centrally operable by a plurality of customer premise equipment. Each customer premise equipment includes a digital ad splicer, an ad content cache, a viewer attribute associator, and an interface to the ad decision logic. A proxy is operable between the customer premise equipment and the ad decision logic and includes an ad request and decision associator. The digital ad splicer is responsive to a control from the proxy identifying ad content, the control from the proxy received via the interface to the ad decision logic. The digital ad splicer is configured to operate the ad content cache to download from a content distribution network ad content determined by the control from the proxy, and to receive the ad content from the ad content cache and to splice the ad content into a simultaneously received and rendered linear program content stream.

14 Claims, 7 Drawing Sheets

(56) References Cited

U.S. PATENT DOCUMENTS

| | | | | |
|---|---|---|---|---|
| 2013/0191869 A1* | 7/2013 | Sugiyama | .......... | H04N 21/4622 |
| | | | | 725/42 |
| 2013/0263180 A1* | 10/2013 | Yang | ................ | H04N 21/25891 |
| | | | | 725/32 |
| 2014/0020013 A1* | 1/2014 | DiLorenzo | ........... | H04N 21/812 |
| | | | | 725/32 |
| 2016/0182923 A1* | 6/2016 | Higgs | .................. | H04H 20/106 |
| | | | | 725/34 |

* cited by examiner

ADDRESSABLE LINEAR DIGITAL ADVERTISING SYSTEM UTILIZING CPE SPLICER

BACKGROUND

In digital advertising systems currently, addressable linear advertising is typically carried out as follows:

1. The audience for advertising content is segmented to put each device/subscriber into a demographic or geographic (or other segmented) category. These audience segments for purposes of targeted advertising are also referred to herein as audience profile categories.

2. Segment identifiers (audience profile categories) are pushed down to the customer premise equipment (e.g., set top boxes) so that each device is identified as belonging to viewer(s) of a particular audience profile category.

3. The same segments are used in ad campaign creation. Once a digital ad campaign is ready to launch (but ahead of the launch window,) a scheduler identifies the associated ad content references to expose to each of the audience segments in the flight window (the time interval allocated to advertising content).

4. Before the flight window opens, the scheduler sends down the details of the profiles that are applicable for the next configurable time period (e.g. the next week or the next month) along with the ad content references.

5. The profile/ad references are added to a delivery schedule. This delivery schedule is delivered to each set top box and is used to tell them when a particular ad asset will be transmitted via an invisible/secret channel.

ii. The set top box compares the delivery schedule with the profiles that it has been given and then gets ready to only record the ad assets (onto DVR storage typically) based on the air time and matching profiles stated in the delivery schedule.

iii. The delivery schedule is then used by an asset distributor back in the pay TV operator's infrastructure to broadcast the ad asset via the invisible/private channel at the allocated time.

This approach doesn't consume excessive bandwidth to send ad assets as a broadcast signal, and does not require a spare tuner in the set top box to record the asset. However, the complexity of this prior approach is excessive. A challenge is to simplify the process without sacrificing the flexibility and scalability of the prior approach.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

"ad content" in this context refers to content promoting or raising awareness of a product or service, displayed in conjunction with program content, but which typically is independent of the program content (can be displayed in conjunction with different program content at different times).

"ADM" in this context refers to (Ad Decision Manager) a logic component in SCTE 130 compliant advanced digital advertising systems, that originates messages articulating ad insertion opportunities (i.e., placement opportunities) with the primary communication consumer being the ADS (Ad Decision Service). The ADM completes the opportunity/decision lifecycle via reporting activity events (i.e., placement status). The ADM communicates placement opportunities to the ADS and the ADS returns placement decisions as a response to placement opportunities. An ADM may support multiple, simultaneously active ADS as each ADS may provide different placement decision services. The ADM block may consult the POIS for placement opportunity information with the POIS fronting an ad opportunity scheduling system (inventory system). Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

"ADS" in this context refers to (Ad Decision Service) a logic component in SCTE 130 compliant advanced digital advertising systems, that determines how advertising content is combined with non-advertising (entertainment) content assets (i.e., placement decisions). The ADS may communicate with the POIS to acquire placement opportunity information. Either or both the ADM and ADS may communicate with the CIS to obtain content asset metadata and ad asset availability information. The ADM, ADS, and/or the POIS may communicate with the SIS in order to obtain relevant subscriber information such as advertising focus refinement parameters and placement opportunity enablement.

"Cache" in this context refers to a temporary storage facility in machine memory that does not survive the lifetime of the logic which creates the cache. A cache may impose age limits on the contents of its memory, and may execute a replacement policy or algorithm against those contents, the replacement policy based on for example frequency of use, age, last use and/or other factors.

"content distribution network (CDN)" in this context refers to a large distributed system of servers deployed in multiple data centers across the Internet. A CDN serves content to end-users with high availability and high performance. CDNs serve Internet content including web objects (text, graphics and scripts), downloadable objects (media files, software, documents), applications (e-commerce, portals), live streaming media, on-demand streaming media, and social networks. While most early CDNs served content using dedicated servers owned and operated by the CDN, some may use a hybrid model that uses P2P technology. In the hybrid model, content is served using both dedicated servers and other peer-user-owned computers as applicable. CDNs may be operated as an application service provider (ASP) on the Internet (also known as on-demand software or software as a service (SaaS)). CDN content (potentially multiple copies) may exist on several servers. When a user makes a request to a CDN hostname, DNS typically resolves to an optimized server (based on location, availability, cost, and other metrics) and that server will handle the request. CDN nodes are usually deployed in multiple locations, often over multiple backbones. Benefits include reducing bandwidth costs, improving page load times, or increasing global availability of content. The number of nodes and servers making up a CDN varies, depending on the architecture, some reaching thousands of nodes with tens of thousands of servers on many remote points of presence (PoPs). Others build a global network and have a small number of geographical PoPs. Requests for content are typically algorithmically directed to nodes that are optimal in some way. When optimizing for performance, locations that are best for serving content to the user may be chosen. This may be measured by choosing locations that are the fewest hops, the least number of network seconds away from the requesting client, or the highest availability in terms of server performance (both current and historical), so as to optimize delivery across local networks. When optimizing for cost, locations that are least expensive may be chosen instead. In an optimal scenario, these two goals tend to align, as servers that are close to the end-user at the edge of the network may have an advantage in performance or cost. Most CDN providers will provide their services over a varying, defined, set of PoPs, depending on the geographic coverage desired, such as United States, International or Global, Asia-Pacific, etc. These sets of PoPs can be called "edges" or "edge networks" as they would be the closest edge of CDN assets to the end user. The CDN's Edge Network grows outward from the origin/s through further acquisitions (via purchase, peering, or exchange) of co-locations facilities, bandwidth, and servers. Content networking techniques The Internet was designed according to the end-to-end principle.[5] This principle keeps the core network relatively simple and moves the intelligence as much as possible to the network end-points: the hosts and clients. As a result the core network is specialized, simplified, and optimized to only forward data packets. Content Delivery Networks augment the end-to-end transport network by distributing on it a variety of intelligent applications employing techniques designed to optimize content delivery. The resulting tightly integrated overlay uses web caching, server-load balancing, request routing, and content services.[6] These techniques are briefly described below. Web caches store popular content on servers that have the greatest demand for the content requested. These shared network appliances reduce bandwidth requirements, reduce server load, and improve the client response times for content stored in the cache. Server-load balancing uses one or more techniques including service-based (global load balancing) or hardware-based, i.e. layer 4-7 switches, also known as a web switch, content switch, or multilayer switch to share traffic among a number of servers or web caches. Here the switch is assigned a single virtual IP address. Traffic arriving at the switch is then directed to one of the real web servers attached to the switch. This has the advantage of balancing load, increasing total capacity, improving scalability, and providing increased reliability by redistributing the load of a failed web server and providing server health checks. A content cluster or service node can be formed using a layer 4-7 switch to balance load across a number of servers or a number of web caches within the network. Request routing directs client requests to the content source best able to serve the request. This may involve directing a client request to the service node that is closest to the client, or to the one with the most capacity. A variety of algorithms are used to route the request. These include Global Server Load Balancing, DNS-based request routing, Dynamic metafile generation, HTML rewriting,[7] and anycasting.[8] Proximity—choosing the closest service node—is estimated using a variety of techniques including reactive probing, proactive probing, and connection monitoring.[6] CDNs use a variety of methods of content delivery including, but not limited to, manual asset copying, active web caches, and global hardware load balancers.

"POIS" in this context refers to (Placement Opportunity Information Service) a logic component in SCTE 130 compliant advanced digital advertising systems, that supplies placement opportunity descriptions. The ADM, ADS, and/or the POIS may communicate with the SIS in order to obtain relevant subscriber information such as advertising focus refinement parameters and placement opportunity enablement.

"Proxy" in this context refers to a network component that acts as a front end to another (back end) component, fulfilling requests to the back end component when possible, otherwise passing the requests to the back end component for fulfillment. A proxy or proxy server may refer to logic installed on a communication path between a client application, such as a web browser or CPE process or application, and a back-end server. It intercepts requests to the back end server and determines if it can fulfill the requests itself. If not, it forwards the requests to the back end server for fulfillment.

"SIS" in this context refers to (Subscriber Information Service) a logic component in SCTE 130 compliant advanced digital advertising systems, that provides relevant subscriber information such as advertising focus refinement parameters.

Description

Described herein is a system providing CPE (consumer premise equipment, e.g. set top box 112) addressable linear advertising. A linear digital advertising system includes ad decision logic configured to be centrally operable by a plurality of customer premise equipment. Each customer premise equipment includes a digital ad splicer, an ad content cache, a viewer attribute associator, and an interface to the ad decision logic. A proxy is operable between the customer premise equipment and the ad decision logic and includes an ad request and decision associator. The digital ad splicer is responsive to a control from the proxy identifying ad content, the control from the proxy received via the interface to the ad decision logic. The digital ad splicer is configured to operate the ad content cache to download from a content distribution network ad content determined by the control from the proxy, and to receive the ad content from the ad content cache and to splice the ad content into a simultaneously received and rendered linear program content stream.

In one embodiment, advertising assets are categorized by CPE audience profile, and stored into separately addressable locations ("bins") on a content distribution network (e.g., CDN 114) for each particular window of potential viewing time (e.g. every 15 minutes, once per hour, daily, weekly, etc.) of a linear digital content stream. The system may utilize de-duplicating logic (techniques are known in the art)

to ensure that if an asset is relevant to multiple different CPE profiles that it's only loaded and stored by the CDN in one bin at a time.

A particular set top box (hereinafter used as an example of any CPE device), once it has downloaded one or more audience qualifiers for the viewers that use that set top box, may in one embodiment periodically request from the CDN all of the ad assets that fit the audience segment(s) for the profile(s)) for a given time period. The periodicity for this retrieval is randomized to prevent all set top boxes from requesting ad assets at the same time. For example, to take impression feedback into account and update assets associated with profiles every hour, the system might be configured to make three (or some other configurable number) attempts to acquire the ad asset within the hour; meaning that in the first 20 minutes at a random time therein the system would attempt to download the ad the assets from the CDN. If the set top box could not for whatever reason download the ad asset then in the next 20 minute period it would attempt to use the same random offset to download the asset, and again retry a 3rd time in the next 20 minute period within the hour, before giving up. The requested ad assets may be from configured CDN bins for the requested audience qualifiers, as provisioned according to active advertising campaigns.

In environments where the network infrastructure supports higher download bandwidth, and higher availability of download bandwidth for CPEs, the CPEs may not perform ad asset caching and may instead download digital advertising on an "as needed" basis for ad breaks in linear program content occurring imminently (e.g., within the next 10 seconds). In other words, in these higher available bandwidth environments, advertising content may be downloaded to the CPE in response to the CPE detecting or being configured with an actual imminent ad break in the linear content stream that is being rendered to the viewer.

After ad asset (digital ad content) acquisition by the CPEs has taken place, whether CPE caching of ad assets is employed or not, ad decisioning and ad splicing may be carried out by the CPE device.

The CPE does not perform any ad decisioning, which is determining which advertising content to insert in the imminent advertising avail/break in the linear program stream. Instead, the CPE detects or is notified of the ad break, and signals an advertising decision service (ADS) that identifies the particular ad content to insert into the break. The ADS then signals the CPE with the identified advertising content and the CPE responds by either downloading the advertising asset from the content distribution network (in non-caching scenarios) or else by pulling the advertising asset from its own ad content cache. The ad content is spliced into the linear program content and the CPE may perform measurement of how the viewer responds to or experiences the ad content.

In one embodiment, even though the CPE performs the ad splice into the program content, a network component is operated in response to the ad decision request from the CPE, in order to affect PTS timing adjustments to the linear program content to account for the decided-upon ad content, to improve accuracy of the digital splice by the CPE.

In embodiments that employ higher levels of ad content caching, the set top box may download a digest file that comprises references for all ad content that might be referenced in an ad decision for a particular time slot. The set top box then downloads these ad assets to the cache in advance of the time slot.

In one embodiment, the set top boxes determine if they need to download ad assets or not by polling the CDN for some URL for a digest (e.g. http://sometvprovider.com/dir/profile_x). Inside the digest file is a timestamp and/or version number to indicate when the digest was last updated, possibly a expiration time by which the set top box should have attempted to reread the digest, possibly some other indicators such as how frequently the set top box would attempt to download assets from the CDN if it couldn't obtain them the first time, the URLs of the assets that should be downloaded by this profile along with the expected expiration timestamp of those assets when they're no longer needed, a checksum so that the asset can be validated for good delivery once the asset has been downloaded by the set top box, and possibly an indicator that the asset is to be considered as a default ad for this profile.

'Creative optimization' may be performed. For example, a generic Ford ad inserted into a program may be replaced in streams received by devices associated with homes with small children with an ad for a Ford minivan, replaced with Ford sports car on devices associated with a single male under 35. The trafficker (e.g., Ford) of an addressable linear ad would associate metadata (associate it with ad opportunity to bind it to "Ford" ads) applied by the optimizer to identify a particular creative, campaign or brand.

Dynamic linear ad insertion (DLAI) metadata is generated by the programmer's automation system (or linear trafficking system or other system involved with trafficking and inserting the national linear ad). The DLAI metadata may in one embodiment be transformed into in-band signaling controls in program content. DLAI metadata is applied as ad targeting parameters (controls) to the campaign manager so that trafficker (define) can assign (to ad opportunities) creatively optimized ad assets in the Campaign Manager.

Ad asset media and associated metadata may be ingested by ad content management system for preparing and distributing ad assets on behalf of the inventory owner. Ad asset metadata may take the form of (but not limited to) Cable-Labs [ADI 1.1] via [SCTE 130-4]. Ad asset metadata may be applied to control the campaign manager for trafficking ad assets against addressable linear campaigns.

Drawings

Figure 1:
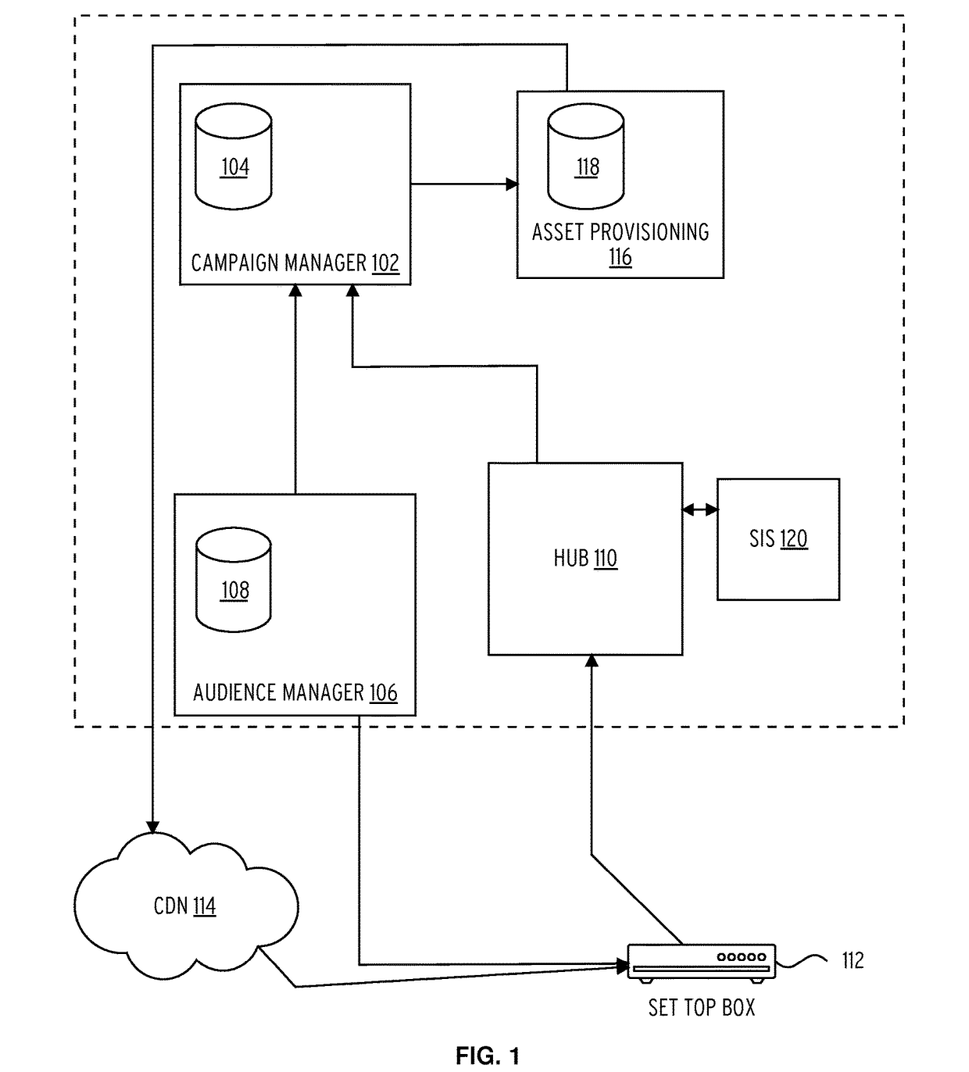
FIG. 1 illustrates an embodiment of a CPE addressable linear system 100.

FIG. 1 illustrates an embodiment of a CPE addressable linear system 100. At a high level, the CPE addressable linear system 100 comprises, inter alia, a campaign manager 102 that includes a campaign attribute associator 104, an asset provisioning 116 that includes an asset attribute associator 118 and that provisions digital advertising to a CDN 114, an audience manager 106 that includes an audience attribute associator 108, a subscriber information system 120, and a hub 110. The CPE addressable linear system 100 interoperates with a set top box 112 to provide linear addressable advertising in streamed digital program content presented to viewers by the set top box 112.

In some embodiments the set top box 112 inter-operates (e.g., via the hub 110) with the audience mutable subscriber information system 120 to obtain frequency cap statistics or to write frequency cap statistics in real time as ad impressions are detected and measured.

The campaign manager 102 identifies advertising content to provision to the CDN 114 that is specifically suited to particular viewers (particular CPEs) based on attributes for the viewers/CPEs communicated from the audience attribute associator 108 to the campaign manager 102. The identified ad content to provision to the CDN 114 matches qualifiers set for a particular ad campaign. Thus, the ad content identified for provisioning to the CDN 114 by the asset provisioning 116 is selected based on both an ad campaign and also on aggregated audience qualifiers associated with particular CPEs. Once the candidate ad content for the ad campaign/particular CPE's is provisioned to the CDN 114, real-time ad decisioning and ad splicing may be carried out (in one embodiment) as set forth for example in FIG. 2.

Figure 2:
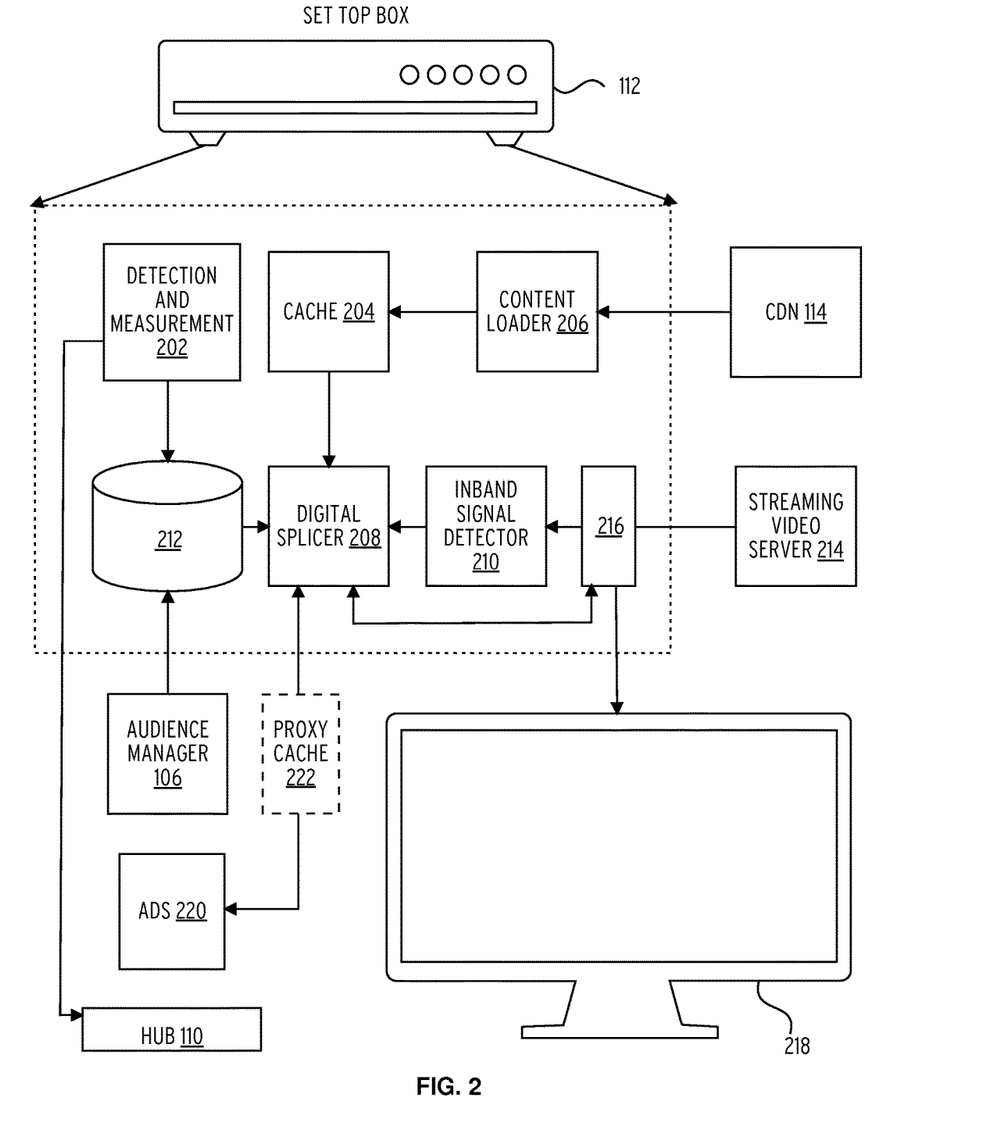
FIG. 2 illustrates an embodiment of customer premise equipment (e.g., set top box 112) operable to perform linear addressable advertising.

FIG. 2 illustrates an embodiment of customer premise equipment (e.g., set top box 112) operable to perform linear addressable advertising. The set top box 112 comprises detection and measurement logic 202, a content cache 204, a content loader 206, a viewer attribute associator 212, a digital splicer 208, and an inband signal detector 210.

The viewer attribute associator 212 receives audience qualifiers from the audience manager 106, which operates the audience attribute associator 108 using an identifier of the set top box 112 to obtain audience attributes for the household or person associated with the set top box 112. The received audience qualifiers may be incorporated into ad requests from the digital splicer 208 to the ad decision service 220.

In some embodiments, the CPE addressable linear system 100 may include a proxy cache 222 that caches ad decisions by the ad decision service 220 and categorizes said ad decisions according to audience qualifiers provided the set top box 112 in ad decision requests. The proxy cache 222 may respond by proxy for the ad decision service 220 to ad decision requests from the digital splicer 208, and may return a cached ad decision from prior requests for CPE's having similar audience qualifiers as the set top box 112.

A CPE addressable linear system 100 may include configuration settings (policies) that determine which types of ad decisions are cached by a proxy cache 222, including:

1. Request pattern matching for cache usage (rules for what ads to cache in the proxy cache 222—make a new ad call or get a previously used (cached) ad; cached assets eventually age out after a period of time (usu seconds) after the ad asset is retrieved)

2. Cache entry expiration interval (a timer setting)

3. Bandwidth control policy

4. Pass through mode (a switch—the proxy cache 222 is passive and no caching is performed when this switch is set)

The proxy cache 222 enables traffic control and optimizations for specific use cases. A system deployed at an operator may iterate through various phases, starting off with minimal amount of resources and building on top of successful deployments.

Utilizing the proxy cache 222 the amount of requests being serviced by the digital ad router 302 can be moderated. For example, if the initial operator use case was for geo-zone based substitution then the proxy cache 222 may be configured so that if a request has been made to a particular addressable linear CPE cluster, then a single ad decision response may be returned from the proxy cache 222 for all calls made from each individual geo-zone CPE group.

The caching strategy of the proxy cache 222 may be configured for example to one or more of the following dimensions:

1. CPE housed audience qualifiers (e.g. geographic)

2. Opportunity event ID—the ba_event_id field of a specific UPID

3. Operator network

If the a proxy cache rule is configured and matches the specified parameters the proxy cache 222 may cache the ad decision response for future requests that may match the corresponding rule, until to some configurable time period at which the record is expunged from the proxy cache 222.

In addition to moderating ad request traffic, the proxy cache 222 may also moderate ad asset download traffic based from the CDN 114 on the number of concurrent or near concurrent requests that are currently being served by the proxy cache 222. An operator may have restrictions on the amount of available download bandwidth for DOCSIS 3.x retrieval of ad assets. As such the proxy cache 222 may be configured to return empty ad responses in the event that configurable thresholds for concurrent CDN 114 ad asset download traffic have been reached. Once concurrent traffic has dropped below the threshold then active ad requests may resume.

For the purposes of field testing, the proxy cache 222 may be configured only to responds with active ad responses to a collection of device IDs. If a request is made to the proxy cache 222 and the device ID isn't included in the list of devices when this feature is enabled then an empty ad response may be returned.

The proxy cache 222 may be the endpoint for all ad requests of the CPE addressable linear system 100, even if a network is deemed to be fully addressable with no caching of responses being needed. This is to minimize the amount of configuration required to be maintained by the CPE device and to provide the operator a choke point for controlling traffic.

The content loader 206 receives digital advertising content from the CDN 114, and operates the cache 204 to store the received digital advertising.

Video program content (ad supported content) is streamed to the set top box 112 and received by the transcoding and rendering logic 216 which operates a display 218 to visually depict the video content. In parallel the streamed video content is received by the inband signal detector 210 which detects inband signals (e.g., SCTE-35 signals) indicative of upcoming and actual ad breaks in the video content.

The digital splicer 208 responds to controls from the inband signal detector 210 by making an ad decision request to the ad decision service 220 (which may be intercepted by the proxy cache 222). The ad decision service 220 (or proxy cache 222) returns an ad decision to the digital splicer 208. In CPE ad content caching embodiments, the digital splicer 208 may locate the ad content identified in the ad decision in the cache 204. In non-caching embodiments, the digital splicer 208 may operate the content loader 206 to download the identified ad content to the cache 204 from the CDN 114.

The digital splicer 208 then interoperates with the transcoding and rendering logic 216 to insert the digital advertising into the ad break of the video content that is rendered on the display 218. The inserted ad content may replace ad content already inserted into the ad break, or may fill an empty ad break.

A contiguous set of GOPs (group of pictures) in the program stream, whose start is designated by using in-band signaling to denote the splice out PTS and duration, may be replaced by a different contiguous set of GOPs from the ad content to insert into the ad break. The set of GOPs in the program content feed may be bounded at the splice-out and splice-in points by IDR frames to promote clean (non-artifacted) splicing.

The replacement set of GOPs may be of equal or lower duration than the program content feed GOPs. If the replacement set of GOPs is lower in duration then the digital splicer 208 may insert black frame content until such time that an IDR frame is reached when the duration has been met or exceeded. This enables a smooth transition between the program content feed and the substituted ad content. The program feed is "live" and time isn't elastic, therefore the substituted GOPs cannot exceed the original GOPs duration as this would lead to an undesirable user experience (glitches, artifacts, etc.).

A joint initiative known as the Reference Development Kit (RDK) is active among content network operators and vendors and provides one platform for CPE device addressable linear. The RDK employs a source/filter/sink design pattern whereby media originates from a source, can be inspected and/or transformed by a filter, and is received by a sink. When media is being watched by a subscriber (known viewer) the media is delivered to a media player component. The RDK has numerous sources for media to originate, e.g., from a QAM tuner, DVR storage, and home networking.

The set top box 112 may comprise detection and measurement logic 202 that detects and records viewer actions during rendering of digital advertising in the advertising breaks of the video program content. For example the detection and measurement logic 202 may detect viewer channel change actions applied to the set top box 112 via a remote control. The detection and measurement logic 202 may operate a timer to measure a time interval from when an advertisement starts rendering on the display 218 until a channel change event is detected, and for how much of the advertisement rendering time the viewer remained tuned to a different channel than the one comprising the advertisement. The detection and measurement logic 202 may operate a return data path to the hub 110, and may communicate to a digital ad router 302 of the hub 110 with results of the measurement of advertisement engagement by the viewer.

Figure 3:
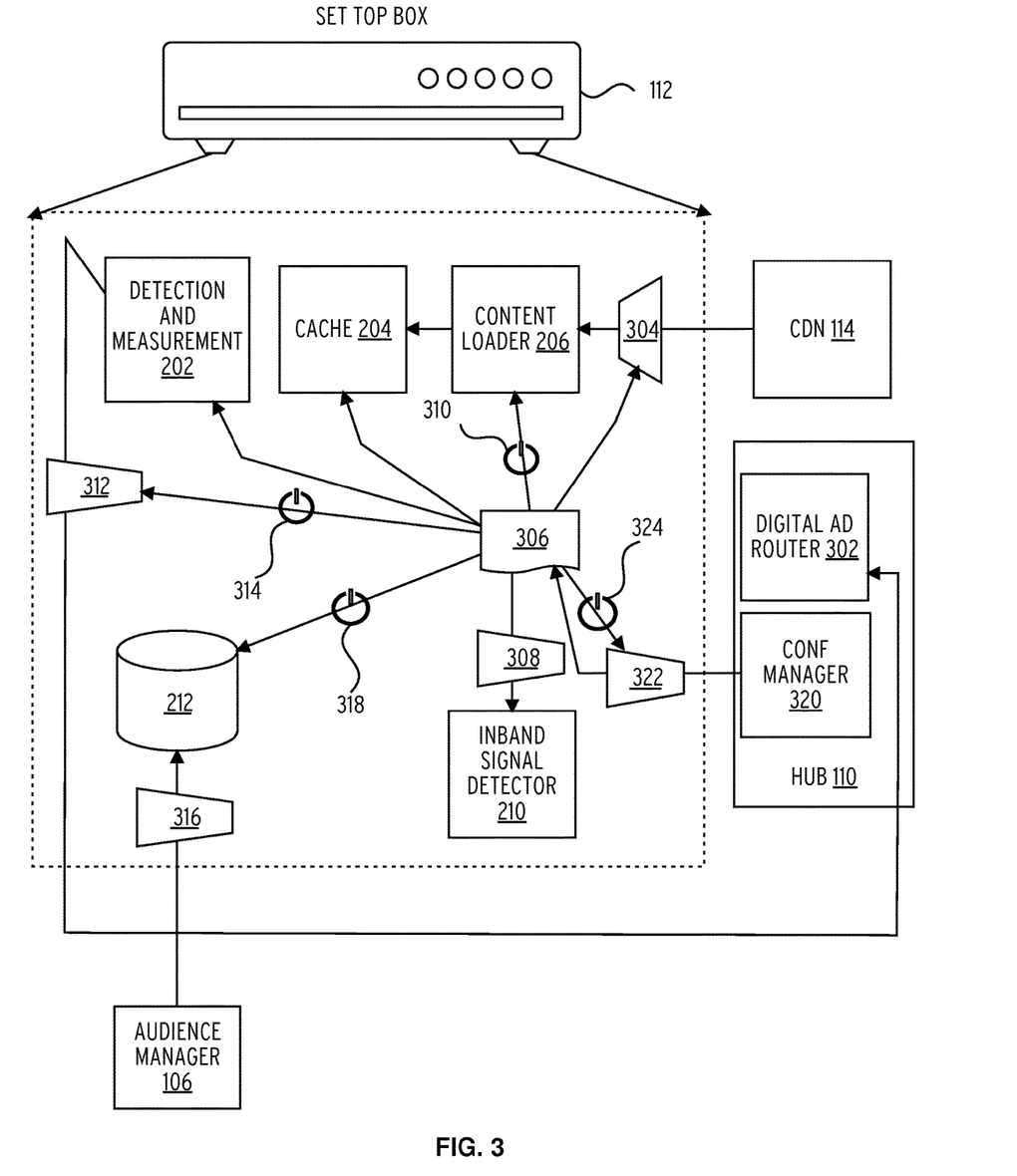
FIG. 3 illustrates an embodiment of customer premise equipment (e.g., set top box 112) operable to perform linear addressable advertising.

FIG. 3 illustrates an embodiment of customer premise equipment (e.g., set top box 112) operable to perform linear addressable advertising.

The set top box 112 may comprise logic embodying machine settings 306 to determine the function of various components of the set top box 112. For example the machine settings 306 may:

Control a switch 304 that enables or disables addressable ad insertion

Set a frequency of a timer 318 for how often the set top box 112 operates the viewer attribute associator 212 to check for download of new audience profiles Set a frequency of a timer 324 to check for updated machine settings 306.

Memory settings for a range of cache 204 memory.

Control a switch 312 to enable or disable return path data to the digital ad router 302.

Operate a timer 314 for communicating return path data

An operational loop setting for a number of retries for return path data

Set a minimum time to wait for return path data retry

Set an amount of volatile memory to reserve for temporary media storage

Figure 4:
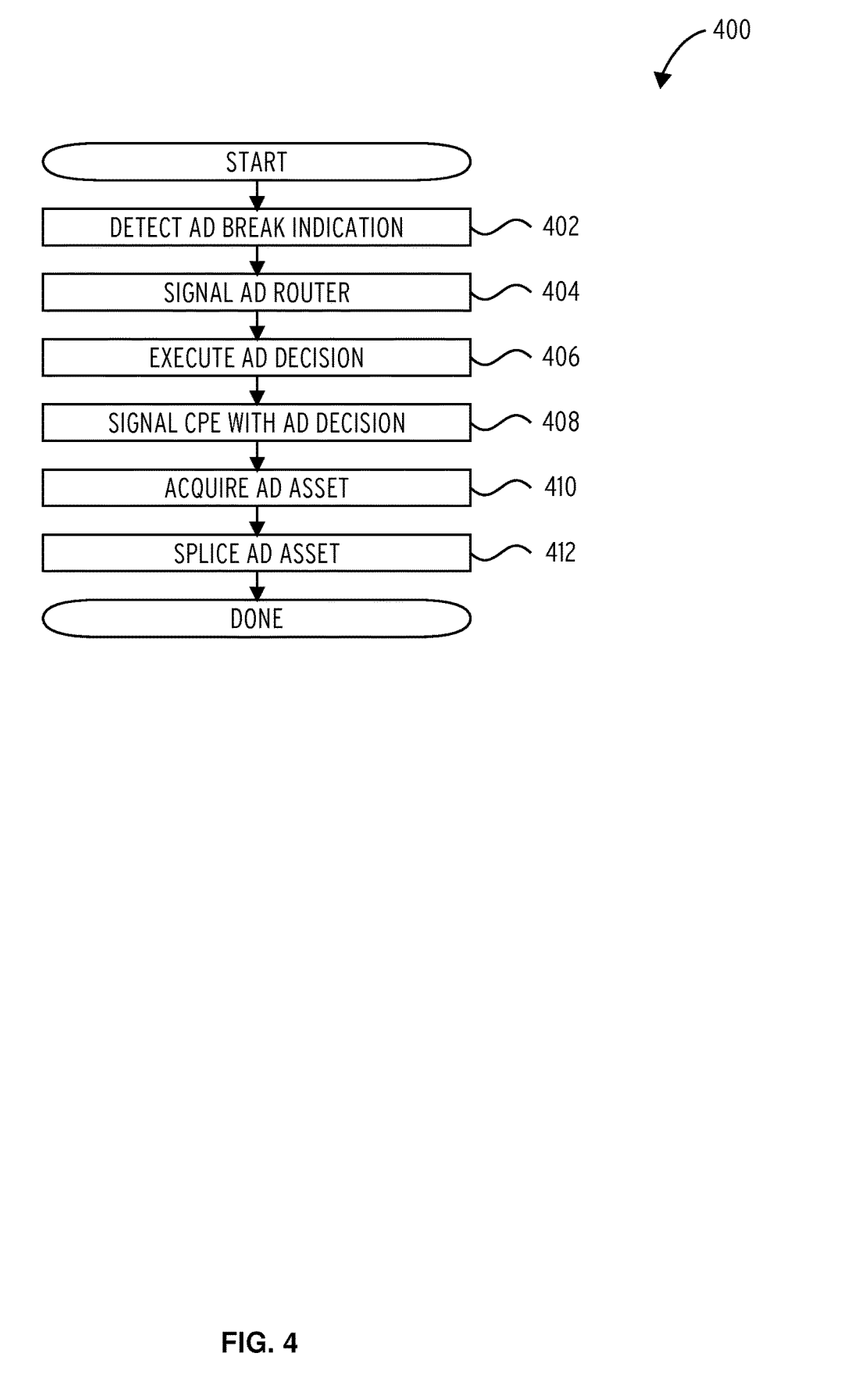
FIG. 4 illustrates an embodiment of a digital ad content insertion process 400.

FIG. 4 illustrates an embodiment of a digital ad content insertion process 400.

After asset acquisition by the CPE has taken place, ad decisioning (selecting digital ads to render to the viewer) and ad splicing may be carried out by the CPE addressable linear system 100.

An ad break indication is detected at block 402, e.g. an in-band signal (e.g. SCTE 35 signal) of the program content the viewer is rendering, denoting an ad opportunity. The inband signal detector 210 detects the in-band signal and makes an ad request to the digital ad router 302 at block 404 (e.g. via SCTE 130-3 or IAB VAST).

The digital ad router 302 executes an ad decisioning process at block 406 (e.g., by invoking the appropriate ADS logic). The ADS returns an ad decision to the digital ad router 302, and in one embodiment the digital ad router 302 then filters an ad campaign line according to: (1) an ad decision identifier, (2) the applicable viewer profile for the signaling CPE, and (3) digital asset references associated with the ad opportunity corresponding to the in-band signal.

Data returned from the ADS may include a viewer profile identifier, an asset identifier, a tracking identifier to distinguish a particular decision to place this asset, a campaign line identifier, and a duration of each ad (in milliseconds). The campaign line identifier is an optimization, as the campaign line could be cross referenced to the tracking identifier. However designing the ADS to return the campaign line identifier makes the system more efficient.

The ADS returns a list of ads in priority order by their position in the ad break. An example of returned ad list metadata for an ad break is:

position 1
[
profile1+asset53+tracking1234+campaignline15+30000 ms
profile2+asset64+tracking2345+campaignline16+30000 ms
]
position2
[
profile1+asset14+tracking3456+campaignline5+15000 ms
]

In this example there are two ads to be placed in the detected ad break. The first is a 30 s ad, followed by a 15 s ad. When this ad decision control structure is communicated to the set top box 112 by the digital ad router 302 at block 408, the set top box 112 checks to see if it matches audience qualifiers corresponding to the stored configuration set "profile1". If there is a match, the set top box 112 then determines if it successfully acquired asset 53 (either via pre-caching or real-time download), and if so, it will splice that asset into the ad break, and report via measurement that the impression occurred.

If there wasn't a match with profile1, the set top box 112 checks for a match against the audience qualifiers corresponding to the stored configuration set "profile2". If a match is made, the set top box 112 splices asset64 into the ad break. If there's no match, the set top box 112 splices a default ad for a profile that it matches, but for which is did not successfully acquire the asset (e.g., a cached default ad). If that fails, then it will render a "run off" (i.e. general exception) default ad of that duration.

This process of locating a suitable ad asset to splice into the program content and then splicing the ad content into the program content is denoted at block 410 and block 412, respectively.

In one embodiment, the digital ad router 302 updates the in-band signaling with the campaign line and ad decision identifier enhanced with viewer profile and asset reference tuples, and multicasts the linear content broadcast to the set top box footprint receiving a particular linear program feed. In other words, the ad decision control structure is communicated in-band with the program content to all the set top boxes receiving a particular program multicast.

Figure 5:
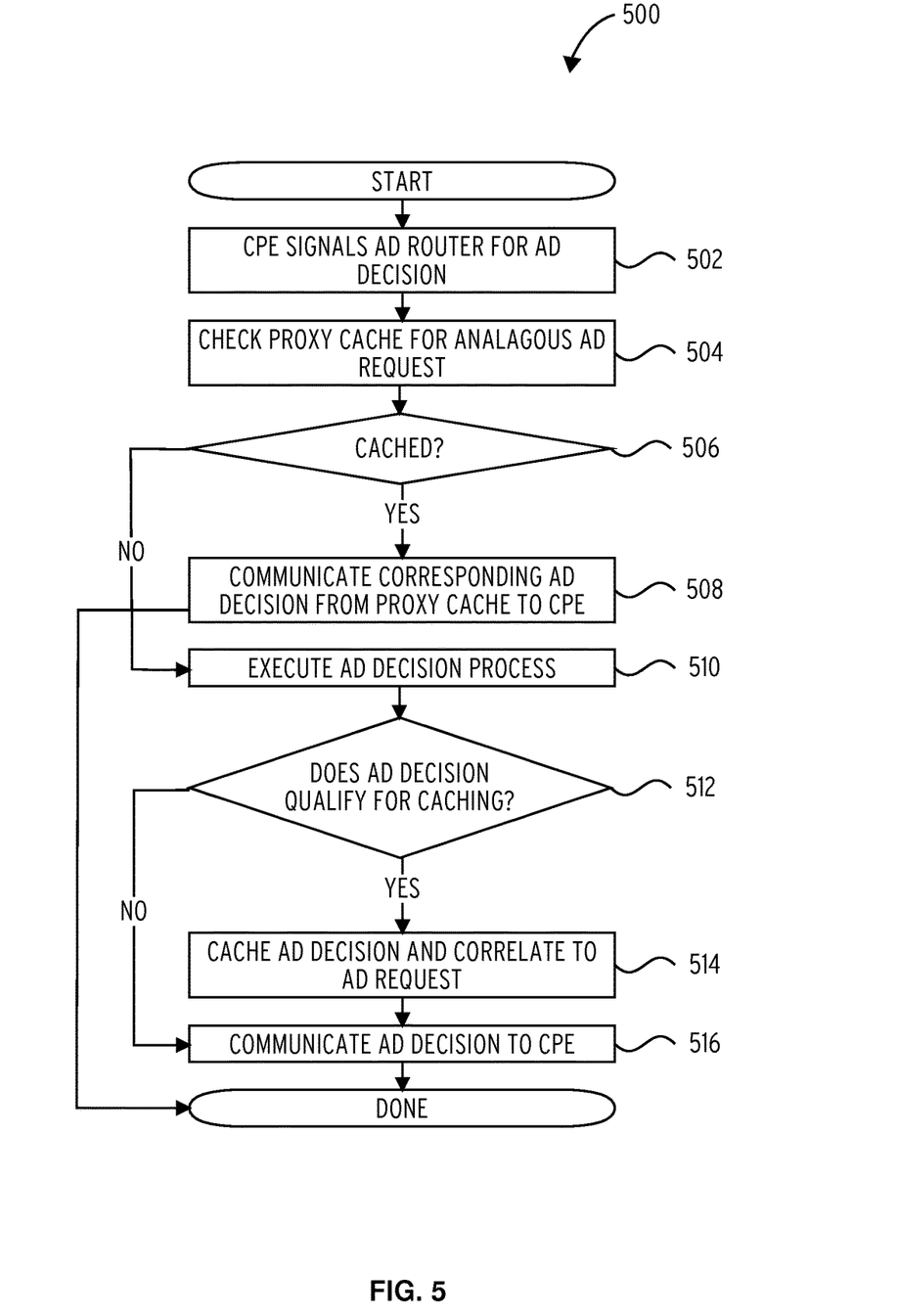
FIG. 5 illustrates an embodiment of an ad splicing process utilizing an ad decision proxy cache 500.

FIG. 5 illustrates an embodiment of an ad splicing process utilizing an ad decision proxy cache 500.

An ad request is made by the CPE to the digital ad router 302, for example via [SCTE 130-3] control signals at block 502.

A check is made at block 504 to determine if the request conforms to the presently active caching policy for ad requests and decisions, and checks if the request is a repeat of a request that was already made. If an ad decision for an analogous ad request is already cached (decision block 506), the ad decision corresponding to the ad request is communicated from the proxy cache to the CPE at block 508.

If the request/response hasn't been cached already, the ad decision process is executed at block 510. The digital ad router 302 may engage a content information system (CIS) to identify associated program metadata using the date/timestamp of the ad decision request and a network identifier in order to obtain program metadata (e.g. program name, season, episode, rating, genre, etc.) for use in the ad decision.

Optionally, if the request is not designated as a cached request and full CPE linear addressability is enabled then the digital ad router 302 may request audience qualifiers and frequency capping metrics from the subscriber information system 120.

The ad router applies routing policies to determine which ad decision service (ADS) to invoke an ad call against.

In the event that a particular ADS is associated with an ad campaign, the ad router may make an ad call to the DAI ADS which responds back with a single ad whose asset reference is pointing to an ad asset media location on the CDN 114.

Optionally, if the request is not designated as a cached request and full addressability is enabled then any updated frequency capping metrics may be written back to the subscriber information system 120.

In the event that a third-party ADS is used the ad router may make an ad call to the third-party ADS which shall respond back with a single ad whose asset reference is pointing to an ad asset media location on the CDN 114. Third party ad servers may optionally use IAB [VAST]. A response is given back to proxy cache. If the interaction is to be cached then the interaction is persisted in the cache.

Other details for implementing ad decisioning for particular audience qualifiers, program content, and/or ad campaigns may follow techniques known in the art.

A check is made at decision block 512 whether the ad decision is subject to caching because it meets the presently active caching policy for the proxy cache.

If the interaction is a subject to being cached, then the ad decision and corresponding decision request are cached in the proxy cache at block 514. CPE identifications in the ad decision request may be replaced with values to indicate that the interaction is to be cached. Only the parameters included in the caching policy plus date/timestamp (with time zone) may be passed through along with the cached device ID surrogate value.

An ad response is returned to the CPE, for example to the digital splicer 208, using for example [SCTE 130-3] PlacementResponse at block 516.

If the digital splicer 208 received an empty ad response (i.e. no splice action required) then the underlying program content feed may be unmodified. If the digital splicer 208 receives a populated ad response the digital splicer 208, then in non-pre caching implementations the digital splicer 208 starts to download a defined set of ad media (as defined by the reserved amount of volatile memory in configuration in terms of group of pictures (GOPs)) into the cache 204. The digital splicer 208 keeps the connection to the CDN 114 open but only resumes downloading the ad media once a complete GOP has been replaced in the program content stream. The digital splicer 208 substitutes complete GOPs from the program feed with GOPs of the downloaded the ad content. Program clock reference (PCR), decode timestamp (DTS) and presentation timestamp (PTS) values of the program content feed are updated to match those of the replaced GOPs.

The digital splicer 208 communicates the updated digital stream to the transcoding and rendering logic 216 for output to the display 218.

If return path configuration is enabled on the CPE, then then the digital splicer 208 operates the return path interface (e.g., to the digital ad router 302, and/or to the subscriber information system 120 for frequency capping configuration) once ad playout has ended (either through normal playout or via interruption such as channel change, soft power off, etc.) with metrics to create, for example, an [SCTE 130-3] PlacementStatusNotification.

Determined by the CPE configuration, the return path interface may operate a timer responsive to randomizing logic within the configured return path time window. If reporting of measurement isn't possible the return path interface may operate loop logic to retry to return communication, according to the configuration for the CPE device.

If a particular ad campaign ADS is configured for utilization then ad impression measurement data is communicated back to the campaign manager to influence a campaign reconciliation process. The measurement data may also be communicated to analytics logic and/or to a third-party ADS for campaign reconciliation (if a third-party ADS is utilized).

In order to distinguish an addressable linear signal from other forms of signaling the following [SCTE 35] control structure may be applied whereby a [SCTE 35] time_signal command comprises a segmentation descriptor with a segmentation-unique program identifier (UPID) (spoofing or retasking the conventional SCTE 35 control structure). In this case, the "unique program identifier" name is used to identify addressable linear splice instructions.

Addressable linear packet identifiers (PIDs) are defined within the PMT on a separate PID. The segmentation UPID contains specific addressable linear instructions.

The [SCTE 35] cue identifier descriptor may be set as follows to indicate a time_signal command and segmentation descriptor is included in the PID.

descriptor_tag: 0x8A: 8 bit wide value to indicate this is a cue identifier descriptor.

descriptor_length: 0x01: 8 bit wide value to indicate the length.

cue_stream_type: 0x02: 8 bit wide value to indicate that this PID is carrying the time_signal command and the segmentation descriptor.

The [SCTE 35] splice info section may be set as follows to indicate a time_signal command and segmentation descriptor.

table_id: 0xFC: 8 bit wide value defined by [SCTE 35].

section_syntax_indindcator: 0: 1 bit wide value defined by [SCTE 35] indicating MPEG short sections are to be used.

private_indicator: 0: 1 bit wide value defined by [SCTE 35].

reserved: 0: 2 bit wide value reserved for future use.

section_length: XXX: 12 bit wide value to indicate the remaining length of the splice_info_section.

protocol_version: 0: 8 bit wide value defined by [SCTE 35].

encrypted_packet: 0: 1 bit wide value to indicate no encryption.

encryption_algorithm: 0: 6 bit wide value to indicate no encryption pts_adjustment: Defined in feed configuration: 33 bit wide value to indicate whether or not the PTS should be adjusted downstream to compensate for splice timing variance.

cw_index: 0: 8 bit wide value that is not defined when encryption isn't used.

reserved: 0: 12 bit wide value reserved for future use.

splice_command_length: XXX: 12 bit wide value to indicate splice command length.

splice_command_type: 0x06: 8 bit wide value to indicate a time_signal is in use.

descriptor_loop_length: XXX: 16 bit wide value to indicate size of the splice descriptor added to this signal.

alignment_stuffing: 0: 8 bit wide value as no encryption is in use.

CRC_32: <computed value>: 32 bit wide computed cyclic redundancy check (CRC) value.

The [SCTE 35] splice_time section may be set as follows to indicate a time_signal command and segmentation descriptor.

time_specified_flag: 1: 1 bit wide value to indicate that PTS value shall be present.

reserved: 0: 6 bit wide value reserved for future use.

pts_time: <runtime value>: 33 bit wide value used to indicate where the splice out point using PTS defined by the programmer automation/compression systems.

A segmentation descriptor is a particular implementation of a splice descriptor. The [SCTE 35] segmentation descriptor section may be set as follows to indicate that this signal relates to an addressable linear opportunity. The payload of the segmentation descriptor may be defined in the proceed segmentation UPID section.

splice_descriptor_tag: 0x02: 8 bit wide value to indicate that this is a segmentation descriptor.

descriptor_length: 8 bit wide value to indicate the length of this descriptor.

identifier: 0x43554549: (ASCII "CUEI"): 32 bit wide value defined by [SCTE 35].

segmentation_event_id: <runtime value>: 32 bit wide value inserted by the programmer automation/compression system that distinguishes one opportunity from another. The value may not be repeated within the context of a program.

segmentation_event_cancel_indicator: 0: 1 bit wide value not used with BlackArrow addressable linear.

program_segmentation_flag: 1: 1 bit wide value used to indicate all PIDs related to the program shall be segmented.

segmentation_duration_flag: 1: 1 bit wide value used to indicate that the segmentation duration shall be specified.

segmentation_duration: <runtime value>: 40 bit wide value used to indicate the duration of the original ad asset in 90 kHz clock ticks. The splicer may continue to insert black frames with no change until the first IDR frame is met in the original feed after the duration is met. For this reason, the original ad should be equal to or great in duration than any of the substituted ads.

segmentation_upid_type: 0x01: 8 bit wide value used to indicate that this segmentation descriptor is user defined and does not follow a standard naming scheme.

segmentation_upid_length: <runtime value>: 8 bit wide value used to indicate the length of the segmentation UPID. The length may be determined by the content of the UPID payload.

segmentation_upid: <runtime value>: This value contains the UPID information:

segmentation_type_id: 0: 8 bit wide value set to be ignored as information categorized by the segmentation type may be contained within the UPID.

segment_num: 0: 8 bit wide value set to be ignored.

segments_expected: 0: 8 bit wide value set to be ignored.

The follow section describes the specific UPID payloads for various addressable linear use cases. All fields are specified in order from the start of the UPID.

A generic addressable linear opportunity is the most basic of addressable linear opportunities. Ownership can be explicitly stated or left to be determined at decision time. There is no implied or guaranteed relationship between the original ad in the feed and any ads that will be spliced into the feed replacing the original ad.

ba_command: 0: 8 bit wide value to indicate that this UPID describes a generic addressable linear opportunity.

ba_event_id: <runtime value>: 128 bit wide value containing a type 4 GUID that uniquely identifies this particular opportunity.

ba_ownership: <runtime value>: 8 bit wide value used to indicate the ownership of a particular opportunity. The value of this field may be one of the following:
0—unspecified (can be resolved at decision time)
1—programmer owned
2—operator owned A creative optimization use case for addressable linear ad insertion provides a way to relate the original ad in the feed with the replaced ads. For example, a programmer may insert a generic Ford ad and then use this type of UPID to provide runtime information that may allow families with young children an ad for a minivan whereas single young males may see a sports car. The DLAI metadata may be used to insert into the signal.

ba_command: 1: 8 bit wide value to indicate that this UPID describes a creative optimized addressable linear opportunity.

ba_event_id: <runtime value>: 128 bit wide value containing a type 4 GUID that uniquely identifies this particular opportunity.

ba_ownership: <runtime value>: 8 bit wide value used to indicate the ownership of a particular opportunity. The value of this field may be one of the following:
0—unspecified (can be resolved at decision time)
1—programmer owned
2—operator owned ba_creative_event_id: <runtime value>: 128 bit wide value containing a type 4 GUID that identifies the creative optimization event. In practice this value may then be used to target specific ad assets, groups of ad assets or campaigns. The campaign manager may target this value in order to traffic replacement ads.

A measurement only opportunity provides no means of implementing ad substitution but does allow for a CPE device to report on its detection within the stream so that measurement information can be recorded.

ba_command: 2: 8 bit wide value to indicate that this UPID describes a generic addressable linear opportunity.

ba_event_id: <runtime value>: 128 bit wide value containing a type 4 GUID that uniquely identifies this particular opportunity.

Figure 6:
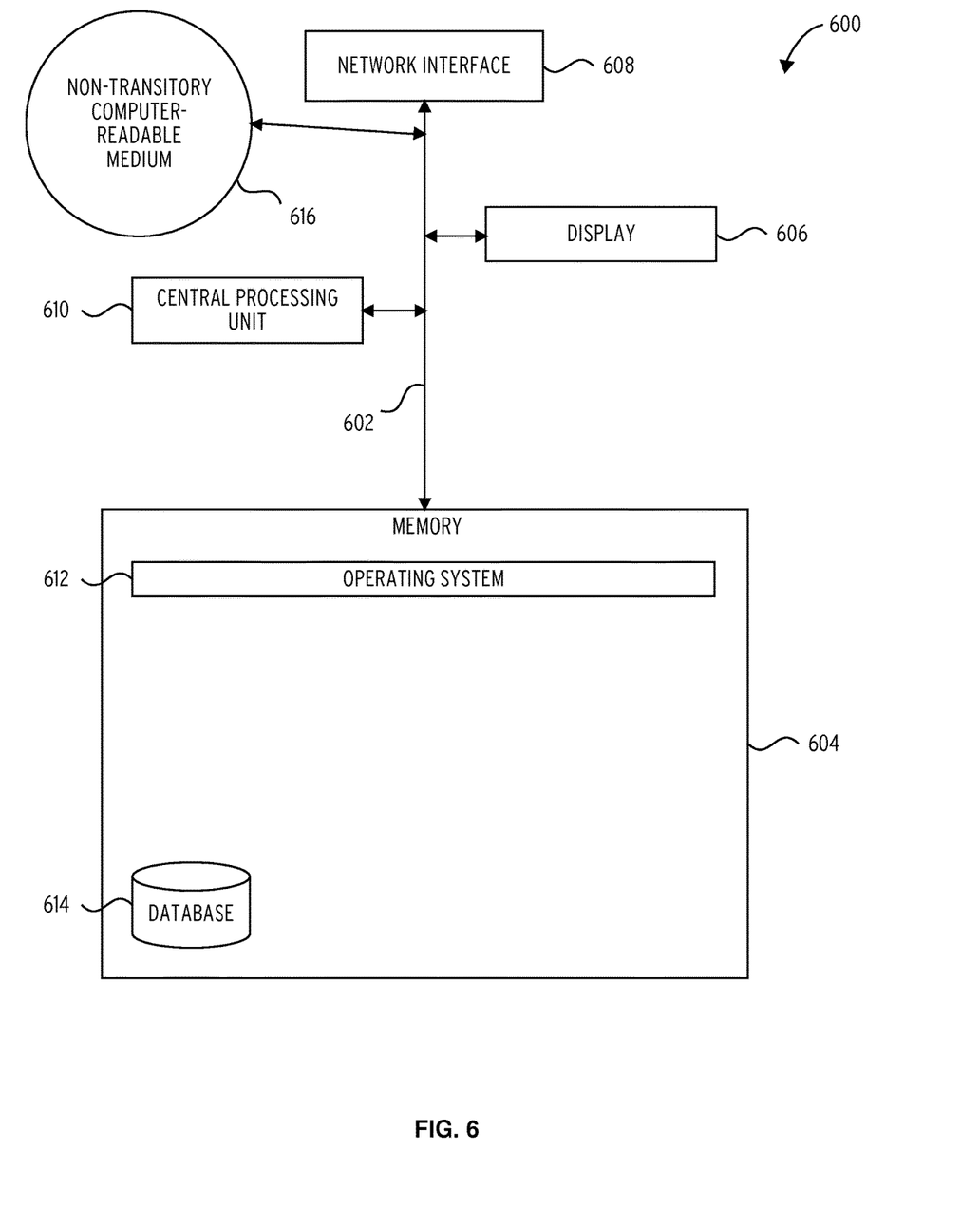
FIG. 6 illustrates a server 600 in accordance with one embodiment.

FIG. 6 illustrates several components of an exemplary server 600 in accordance with one embodiment. They server 600 may be configured with logic to operate, for example, as a proxy cache 222 or to operate as one of the other components of the CPE addressable linear system 100. In various embodiments, server 600 may include a desktop PC, server, workstation, mobile phone, laptop, tablet, set-top box, appliance, or other computing device that is capable of performing operations such as those described herein. In some embodiments, server 600 may include many more components than those shown in FIG. 6. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 600 may comprise one or more physical and/or logical devices that collectively provide the functionalities described herein. In some embodiments, server 600 may comprise one or more replicated and/or distributed physical or logical devices.

In some embodiments, server 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 600 includes a bus 602 interconnecting several components including a network interface 608, a display 606, a central processing unit 610, and a memory 604.

Memory 604 generally comprises a random access memory ("RAM") and permanent non-transitory mass storage device, such as a hard disk drive or solid-state drive. Memory 604 stores an operating system 612.

These and other software components may be loaded into memory 604 of server 600 using a drive mechanism (not shown) associated with a non-transitory computer-readable medium 616, such as a floppy disc, tape, DVD/CD-ROM drive, memory card, or the like.

Memory 604 also includes database 614. In some embodiments, server 200 (deleted) may communicate with database 614 via network interface 608, a storage area network ("SAN"), a high-speed serial bus, and/or via the other suitable communication technology.

In some embodiments, database 614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 7:
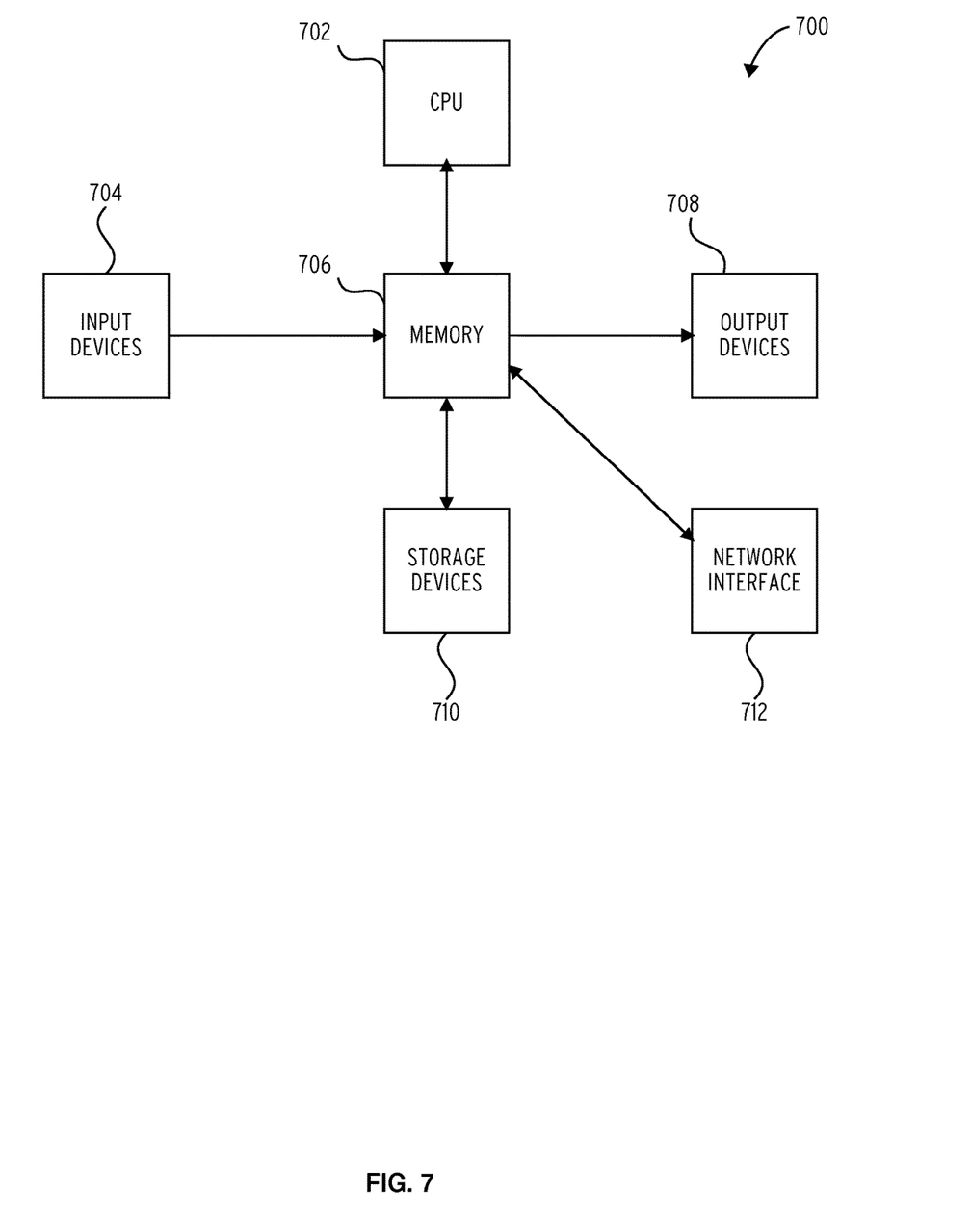
FIG. 7 illustrates an embodiment of a digital apparatus 700 to implement components and process steps of the system described herein.

FIG. 7 illustrates an embodiment of a digital apparatus 700 to implement components and process steps of the system described herein. For example, the digital apparatus 700 may be configured to operate as a set top box 112 or other CPE device.

Input devices 704 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 704 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 704 are provided via various machine signal conductors (e.g., busses or network interfaces) and circuits to memory 706.

The memory 706 is typically what is known as a first or second level memory device, providing for storage (via configuration of matter or states of matter) of signals received from the input devices 704, instructions and information for controlling operation of the CPU 702, and signals from storage devices 710.

Information stored in the memory 706 is typically directly accessible to the CPU 702 of the device. Signals input to the device cause the reconfiguration of the internal material/energy state of the memory 706, creating in essence a new machine configuration, influencing the behavior of the digital apparatus 700 by affecting the behavior of the CPU 702 with control signals (instructions) and data provided in conjunction with the control signals.

Second or third level storage devices 710 may provide a slower but higher capacity machine memory capability. Examples of storage devices 710 are hard disks, optical disks, large capacity flash memories or other non-volatile memory technologies, and magnetic memories.

The CPU 702 may cause the configuration of the memory 706 to be altered by signals in storage devices 710. In other words, the CPU 702 may cause data and instructions to be read from storage devices 710 in the memory 706 from which may then influence the operations of CPU 702 as instructions and data signals, and from which it may also be provided to the output devices 708. The CPU 702 may alter the content of the memory 706 by signaling to a machine interface of memory 706 to alter the internal configuration, and then converted signals to the storage devices 710 to alter its material internal configuration. In other words, data and instructions may be backed up from memory 706, which is often volatile, to storage devices 710, which are often non-volatile.

Output devices 708 are transducers which convert signals received from the memory 706 into physical phenomenon such as vibrations in the air, or patterns of light on a machine display, or vibrations (i.e., haptic devices) or patterns of ink or other materials (i.e., printers and 3-D printers).

The network interface 712 receives signals from the memory 706 and converts them into electrical, optical, or wireless signals to other machines, typically via a machine network. The network interface 712 also receives signals from the machine network and converts them into electrical, optical, or wireless signals to the memory 706.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A system, comprising:
    ad decision logic configured to be centrally operable by a plurality of customer premise equipment;
    each of the customer premise equipment comprising a digital ad splicer, an ad content cache, a viewer attribute associator, and an interface to the ad decision logic;
    a proxy operable between the customer premise equipment and the ad decision logic, the proxy comprising an ad request and decision associator;
    the digital ad splicer responsive to a control from the proxy identifying ad content, the control from the proxy received via the interface to the ad decision logic;
    the digital ad splicer configured to operate the ad content cache to download from a content distribution network the ad content determined by the control from the proxy;
    the digital ad splicer configured to receive the ad content from the ad content cache and to splice the ad content into a simultaneously received and rendered linear program content stream;
    the customer premise equipment to download one or more audience qualifiers and periodically retrieve from the content distribution network the ad content that matches one or more audience segment for the audience qualifiers for one or more windows of potential viewing time; and a periodicity of retrieving the ad content is randomized across a plurality of the customer premise equipment.

2. The system of claim 1, further comprising:

an ad content distributor operable to store the ad content into separately addressable locations on the content distribution network for each of a plurality of distinct windows of potential viewing time of the linear program content stream.

3. The system of claim 2, further comprising:

the ad content distributor to store the ad content in distinct ones of the separately addressable locations for specified audience qualifiers in an advertising campaign.

4. The system of claim 2, further comprising:

the ad content distributor comprising de-duplicating logic to ensure that if the ad content is associated with multiple different ones of the customer premise equipment profiles that the ad content is only stored by the content distribution network in one of the separately addressable locations at a time.

5. The system of claim 2, further comprising:

the customer premise equipment to download the ad content from the content distribution network in response to an imminent ad break in the linear program content stream.

6. The system of claim 5, further comprising:

the customer premise equipment to detect or be notified of the imminent ad break, and to signal an advertising decision service (ADS) that identifies the ad content to insert into the imminent ad break;

the customer premise equipment to receive a signal from the advertising decision service identifying the ad content;

the customer premise equipment responding to the signal from the advertising decision service by either downloading the ad content from the content distribution network or by reading the ad content from the ad content cache;

the customer premise equipment splicing the ad content into the linear program content stream; and the customer premise equipment measuring a viewer response to the ad content.

7. The system of claim 6, further comprising:

a network component separate from the customer premise equipment to affect Presentation Time Stamp timing adjustments to the linear program content stream to compensate for splicing of the ad content by the customer premise equipment.

8. The system of claim 2, further comprising:

the customer premise equipment to download a digest file comprising references to the ad content that are candidates to be identified in an ad decision for a particular time slot; and the customer premise equipment to download the ad content of the references to the ad content cache in advance of the particular time slot.

9. The system of claim 8, further comprising:

the customer premise equipment polling the content distribution network for a URL for the digest file.

10. The system of claim 1, further comprising:

the customer premise equipment to make a configured number of attempts to acquire the ad content within a configured time interval.

11. The system of claim 1, further comprising:

the customer premise equipment to perform household-specific creative optimization to replace ads already inserted into the linear program content stream.

12. The system of claim 11, further comprising:

the customer premise equipment to apply dynamic linear ad insertion (DLAI) metadata for the linear program content stream to perform the creative optimization.

13. The system of claim 12, further comprising:

the metadata comprising in-band signaling controls in the linear program content stream.

14. A system, comprising:

ad decision logic configured to be centrally operable by a plurality of customer premise equipment;

each of the customer premise equipment comprising a digital ad splicer, an ad content cache, a viewer attribute associator, and an interface to the ad decision logic;

a proxy operable between the customer premise equipment and the ad decision logic, the proxy comprising an ad request and decision associator;

the digital ad splicer responsive to a control from the proxy identifying ad content, the control from the proxy received via the interface to the ad decision logic;

the digital ad splicer configured to operate the ad content cache to download from a content distribution network the ad content determined by the control from the proxy;

the digital ad splicer configured to receive the ad content from the ad content cache and to splice the ad content into a simultaneously received and rendered linear program content stream;

an ad content distributor operable to store the ad content into separately addressable locations on the content distribution network for each of a plurality of distinct windows of potential viewing time of the linear program content stream; and the ad content distributor comprising de-duplicating logic to ensure that if the ad content is associated with multiple different ones of the customer premise equipment profiles that the ad content is only stored by the content distribution network in one of the separately addressable locations at a time.

* * * * *